3,403,877
CHRISTMAS TREE STAND
Kristinn F. Gudmundson, 515 Avenue B,
Snohomish, Wash. 98290
Filed Sept. 12, 1966, Ser. No. 578,730
2 Claims. (Cl. 248—48)

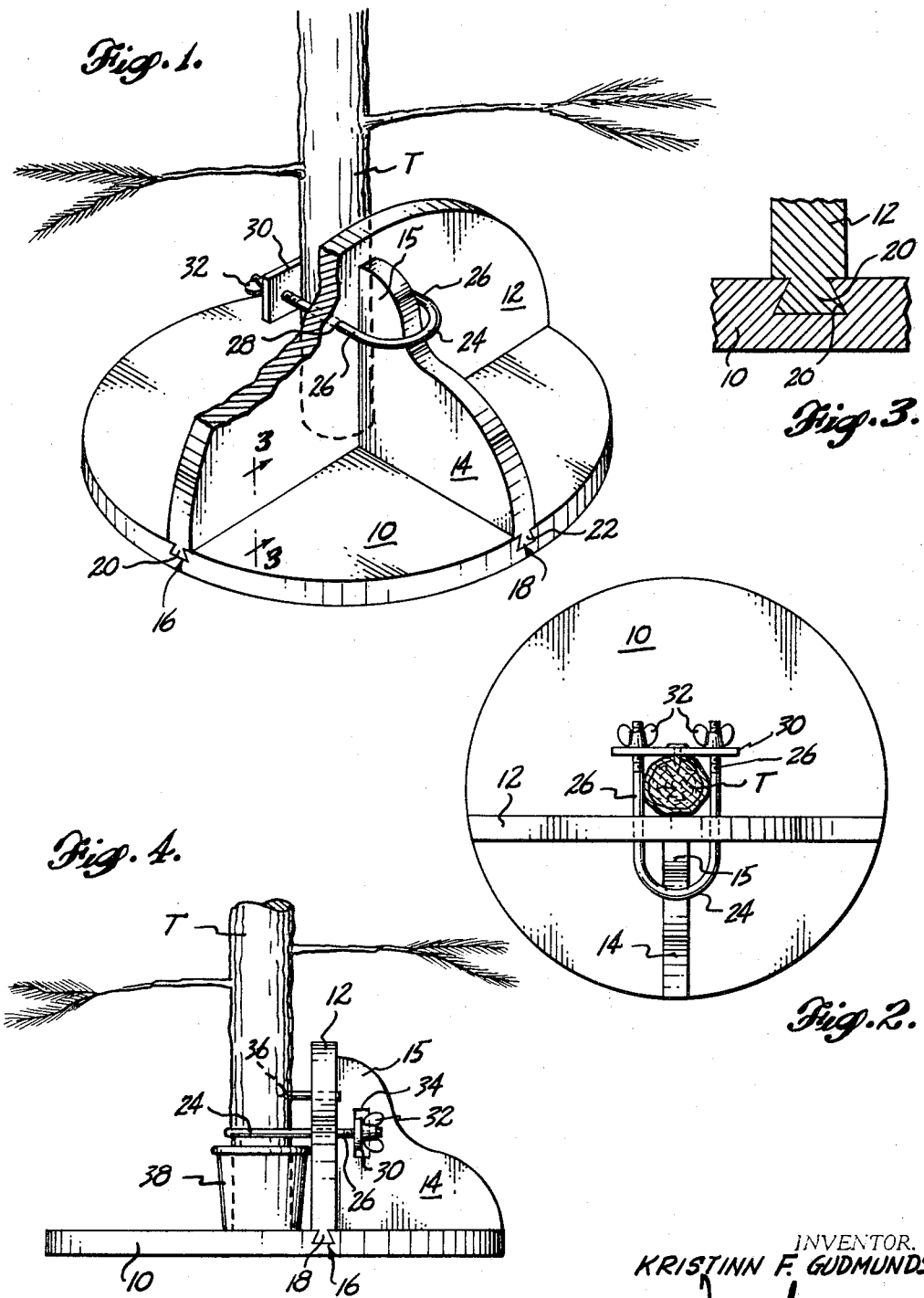

ABSTRACT OF THE DISCLOSURE

This invention concerns a Christmas tree stand in which there is a broad base having T-shaped superstructure, rigidly connected to the base, adapted to have the butt of a tree trunk securely clamped thereto. The parts of the stand are easily assembled from a knocked-down disassembly and may be readily be disassembled for storage during non-use. Preferably the parts interfit and are joined by sliding motions.

Background

Broad based Christmas tree stands are known and such having superstructures adapted to have a tree butt clamped therein have been shown. Generally these prior devices are bulky, not capable of easy assembly or disassembly, and they do not lend themselves to compact packaging for shipment and storage. None are known which can be somewhat loosely pre-assembled and then rigidified by the tree clamping means as claimed herein.

Summary and objects of the invention

An important object is to provide a Christmas tree stand that is simple to construct and easy to assemble. This is accomplished by providing a base to which a transverse wall is connected upright and a lateral buttressing wall is secured. When a tree butt is clamped to the transverse wall and the buttressing wall is also engaged the tree stand parts are rigidified and the tree is firmly held in vertical display. Another object concerns quick connection of the walls to the base. This is accomplished in the preferred form without the use of fasteners by providing interfitting, sliding tongue-and-groove connections between the walls and the base.

Figures of the drawings

FIGURE 1 is a perspective of the Christmas tree stand, portions being broken away for convenience of illustration;

FIGURE 2 is a plan view;

FIGURE 3 is a detailed sectional view on line 3—3 of FIGURE 1; and

FIGURE 4 is a side elevation of a modification of the stand.

Description of the invention

Broadly stated, this Christmas tree stand comprises a broad base having an upstanding first wall secured thereto and laterally disposed thereacross adjacent the broadest dimension of the base. A buttress wall also secured to the broad base upstands and desirably is fastended against one face of the lateral wall to support the same. Means securely connect the upstanding first and buttressing walls to the base. Preferably securement of the two walls to the base is obtained by interfitting dovetail tongues and grooves which may be slideably assembled. Clamping means is provided for drawing a Christmas tree trunk against said first wall in opposition to the buttress member. In certain cases the clamping means may also draw said first and buttressing walls into intimate association to rigidify the assembly as well as to support a Christmas tree.

More specifically, in the preferred form of the invention shown in the drawings, the broad base member 10 may comprise a disc formed, for example, of plywood or the like. The first or transverse wall 12 may assume the arcuate shape indicated and preferably extends transversely across the base member adjacent its broadest dimension. By referring to FIGURE 4 it will be seen that desirably transverse wall 12 is slightly to one side of the broadest dimension of the base 10 so that in final assembly a tree trunk T will be disposed centrally and more or less symmetrically of the base. Buttress or lateral wall 14 is disposed normal to the back side of wall 12 and upstands relative the base 10. The combination of walls 12 and 14 results in a T-shaped tree supporting structure. Both walls 12 and 14 may likewise be formed of plywood or the equivalent and obviously may be secured to the base in numerous ways, as by screws or nails or by gluing.

The bottom edges of walls 12 and 14 are preferably mounted on the base 10 in such manner that they are rigidly and non-shiftably located thereabove. A very effective connecting means comprises on interfitting tongue and groove arrangement shown in FIGURE 3, designed for sliding assembly. When the parts of the stand are made from plywood the base is provided with a dovetail groove 16 extending across the broadest dimension. An intersecting dovetail groove 18 at right angles thereto extends from at least one other side of the base. In such case the lower edge of wall 12 has a dovetail tongue 20 and wall 14 has a dovetail tongue 22, both shaped and dimensioned to slidingly fit into respective grooves 16 and 18.

It will be seen that this stand may thus be shipped in a knocked-down condition in the interest of reducing the bulk of the parts to a very compact package. When it is desired to use the stand it may be assembled by a person with relatively little skills simply by inserting and sliding tongue 20 into groove 16 and thus locating wall 12 in its upright position. In a similar manner tongue 22 is inserted into the outer end of groove 18 and wall 14 by sliding motion is then brought into buttressing and normal relation to wall 12. At this stage, the parts may be reasonably loose and easily shifted relative the base and each other.

Draft means including a saddle member encircle or engage about that portion of a tree trunk away from the supporting surface of wall 12. Such means may also embrace an upper horn 15 or the equivalent of wall 14.

In FIGURE 1 a U-shaped yoke 24 straddles the outer surface of wall 14 in the neighborhood of horn 15 and has its legs 26, 26 passing through openings 28 in wall 12 and along either side of a tree trunk T. A cross or saddle member 30 bears against the tree trunk with the ends of legs 26 passing through member 30. The ends of legs 26 are threaded and engaged by wing nuts 32. When nuts 32 are tightened on the legs 26 to press saddle 30 against the trunk, pressure is also applied, by reason of the yoke 24 embracing the upper portion of wall 14, to draw the assembly of walls and base into tight and intimate relation. Wall 12 will be non-shiftable because the clamping means engages it and wall 14 which, for similar reasons, is likewise non-shiftable.

In FIGURE 4 an alternate clamping arrangement is shown. The yoke 24 has its U-portion astraddle and embracing the trunk T against the front of wall 12 and with its legs 26 passing through wall 12 to the rear thereof. A slot or opening 34 through the upper portion of wall 14 receives the cross strap 30. Clamping pressure is applied by wing nuts 32 as described.

As an aid to prevent tilting of the tree in the supporting plane of wall 12, a sharpened pin 36 may be mounted in wall 12 to be pressed into and to engage the tree trunk T as best shown in FIGURE 4. Also a container 38 for water is indicated as resting on base 10 and receiving the lower end of trunk T in order to supply fluid to prevent undue drying of the tree.

What is claimed is:

1. A Christmas tree stand, comprising:
   a broad planar base member having on its upper surface an undercut transverse groove adjacent its broadest dimension and a second undercut groove normal to said transverse groove;
   a first wall extending substantially the length of said transverse groove and having male means on its lower edge interfitting in said groove;
   a buttress wall having male means on its lower edge interfitting with said second groove and adopted to abut said first wall; and
   clamp means to embrace an upper portion of said buttress wall and a tree butt standing on said base against said first wall in opposition to said buttress wall to consolidate the same with said main wall.

2. The structure according to claim 1 in which the grooves in the base member and the male means interfitting therewith are dovetail shaped.

References Cited

UNITED STATES PATENTS

| | | | |
|---|---|---|---|
| 650,001 | 5/1900 | Becker et al. | 248—44 |
| 685,049 | 10/1901 | Kerr | 248—48 |
| 893,247 | 7/1908 | Killerbrue | 248—44 |
| 1,255,557 | 2/1918 | Norman | 248—44 |
| 2,455,404 | 12/1948 | Brown et al. | 248—44 |
| 2,592,895 | 4/1952 | Harris | 248—44 |

FOREIGN PATENTS

| | | |
|---|---|---|
| 532,940 | 11/1956 | Canada. |

ROY D. FRAZIER, *Primary Examiner.*

FRANK DOMOTOR, *Assistant Examiner.*